United States Patent
Tyson et al.

(10) Patent No.: US 9,332,138 B2
(45) Date of Patent: *May 3, 2016

(54) GUEST-ACTIVATED IMAGE CAPTURE SYSTEM FOR VENUES AND ASSOCIATED METHODS

(71) Applicant: Colorvision International, Inc., Orlando, FL (US)

(72) Inventors: Henry Tyson, Orlando, FL (US); William Matzinger, Orlando, FL (US); Bryan Wilkins, Orlando, FL (US); Mark Simmons, Orlando, FL (US)

(73) Assignee: Colorvision International, Inc., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/833,325

(22) Filed: Aug. 24, 2015

(65) Prior Publication Data

US 2015/0365544 A1  Dec. 17, 2015

Related U.S. Application Data

(63) Continuation of application No. 13/887,532, filed on May 6, 2013, now Pat. No. 9,143,744.

(60) Provisional application No. 61/642,892, filed on May 4, 2012.

(51) Int. Cl.
*H04N 7/18* (2006.01)
*H04N 1/00* (2006.01)
*H04N 5/232* (2006.01)

(52) U.S. Cl.
CPC ......... *H04N 1/00172* (2013.01); *H04N 1/0018* (2013.01); *H04N 1/00196* (2013.01); *H04N 1/00244* (2013.01); *H04N 1/00326* (2013.01); *H04N 1/00931* (2013.01); *H04N 5/23238* (2013.01); *H04N 5/23293* (2013.01); *H04N 7/181* (2013.01); *H04N 2201/0084* (2013.01); *H04N 2201/3205* (2013.01); *H04N 2201/3276* (2013.01)

(58) Field of Classification Search
CPC . H04N 7/181; H04N 1/00172; H04N 1/0018; H04N 1/00196; H04N 1/00931; H04N 1/00153; H04N 1/00164; H04N 1/00198; H04N 2201/0084; H04N 2201/3205; H04N 2201/3276
USPC .......... 348/159, 143, 156; 340/5.2, 5.74, 5.81
IPC ....................................................... H04N 7/18
See application file for complete search history.

(56) References Cited

U.S. PATENT DOCUMENTS

6,587,839 B1    7/2003    McIntyre et al.
2014/0114738 A1    4/2014    Tseng et al.

*Primary Examiner* — Sherrie Hsia
(74) *Attorney, Agent, or Firm* — Allen, Dyer, Doppelt, Milbrath & Gilchrist, P.A.

(57) ABSTRACT

An image capture system for a venue includes fixed image capture areas spaced throughout the venue. Each fixed image capture area includes at least one camera, and a kiosk coupled to the at least one camera. The kiosk includes an identification (ID) reader to read a guest ID presented by a guest, and a processor to activate the at least one camera to take a photo of the guest based on the ID reader reading the guest ID. The processor also links the guest ID with the photo. A server is coupled to the fixed image capture areas to store each photo with the linked guest ID.

30 Claims, 7 Drawing Sheets

GUEST-ACTIVATED IMAGE CAPTURE SYSTEM FOR VENUES AND ASSOCIATED METHODS

RELATED APPLICATION

This application is a continuation of U.S. patent application Ser. No. 13/887,532 filed May 6, 2013, which claims the benefit of U.S. Provisional Application No. 61/642,892 filed May 4, 2012, the entire contents of which are hereby incorporated herein in their entirety by reference.

FIELD OF THE INVENTION

The present invention relates to the field of photography, and more particularly, to a photograph tracking and retrieval system for park guests at a theme park.

BACKGROUND OF THE INVENTION

When visiting a theme park, such as Disney and Universal, for example, it is common for guests to be approached by a theme park photographer to have their photo taken as a souvenir that can later be retrieved at a designated area. For each park guest and their group having their photo taken, a printed ticket with a number corresponding to their particular photo is given to them by the theme park photographer.

The number on the printed ticket typically corresponds to a bar code that is associated with the photo or photos taken by the theme park photographer of the park guest and their group. A different bar code is used for each park guest and their group having their photo taken.

To associate the bar codes with the photos being taken, a personal digital assistant (PDA) is used. Each theme park photographer has a PDA coupled to their camera via an interface cord. The theme park photographer uses the PDA to first read or scan a bar code. The bar code is usually taken from a tablet of bar codes carried by the theme park photographer. After the photos of a park guest and their group have been taken, they are then transferred to the PDA. The PDA includes software that associates the bar code with the corresponding photos taken of the park guest. This process is repeated for each group of park guests having their photo taken.

The theme park photographer later transfers the stored photos and corresponding bar codes in the PDA to a photography database. Prior to leaving the theme park, the park guest can present their printed ticket at a photography gift shop. The photography database is searched using the number on the printed ticket which corresponds to the bar code used to identify their photos.

A drawback of using theme park photographers to capture the experiences of theme park guests is cost. The use of theme park photographers is labor intensive. In addition, theme park photographers typically roam around the theme park, which means that park guests may miss out on the opportunity to have their photo taken a certain spots that are very scenic and reflective of their experiences at the theme park.

SUMMARY OF THE INVENTION

In view of the foregoing background, it is therefore an object of the present invention to provide a cost effect approach for capturing the experiences of venue guests.

This and other objects, features, and advantages in accordance with the present invention are provided by an image capture system for a venue comprising fixed image capture areas spaced throughout the venue, with each fixed image capture area comprising at least one camera, and a kiosk coupled to the at least one camera. The kiosk may comprise an identification (ID) reader to read a guest ID presented by a guest, and a processor to activate the at least one camera to take a photo of the guest based on the ID reader reading the guest ID. The processor may also link the guest ID with the photo. A server may be coupled to the fixed image capture areas to store each photo with the linked guest ID.

The same guest ID may be used by the guest at other fixed image capture areas to take additional photos of the guest based on each respective ID reader configured to read the same guest ID. The server may then store the additional photos of the guest with the same linked guest ID so as to form a personal photo album of the guest.

The image capture system advantageously allows photos of the guests to be taken without the need for a venue employee to be present. This saves on costs, as well as giving the guests the option to have their photos taken in designated areas that may be themed to best capture the experiences of the guest at the venue.

The image capture system may further comprise at least one input device coupled to the server to receive the guest ID from the part guest. At least one display may be coupled to the server to display the photo linked with the guest ID as received by the at least one input device.

The server may be coupled to the Internet to allow the guest to remotely retrieve each photo with the linked ID. The server may be further configured to associate an email address of the guest with the guest ID to assist with the retrieval.

Each fixed image capture area may further comprise a count-down display coupled to the processor, with the count-down display being activated based on the ID reader reading the guest ID to count-down a pre-defined time before activating the at least one camera.

Each fixed image capture area may comprise a ground marking on where the guest is to stand for the photo. The at least one camera may be configured to take a photo with a panoramic view.

The kiosk may further comprise a display coupled to the processor, where the processor may display instructions on how to activate the at least one camera.

The guest ID may be on a venue admission ticket used by the guest to enter the venue. Alternatively, the guest ID may be generated by a mobile wireless communications device carried by the guest.

Each image capture area may have a theme associated therewith, and the processor may be map the photo of the guest within the themed image capture area to an extended scene, with the extended scene being a panoramic view extending the theme of the themed image capture area.

Another aspect of the present invention is directed to a method for operating an image capture system for a venue as described above. The method may comprise operating the ID reader within the kiosk to read a guest ID presented by a guest. The method may further comprise operating the processor within the kiosk to activate the at least one camera to take a photo of the guest based on the ID reader reading the guest ID, and to link the guest ID with the photo. The server may be operated to store each photo with the linked guest ID.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime notations are used to indicate similar elements in alternative embodiments.

Figure 1:
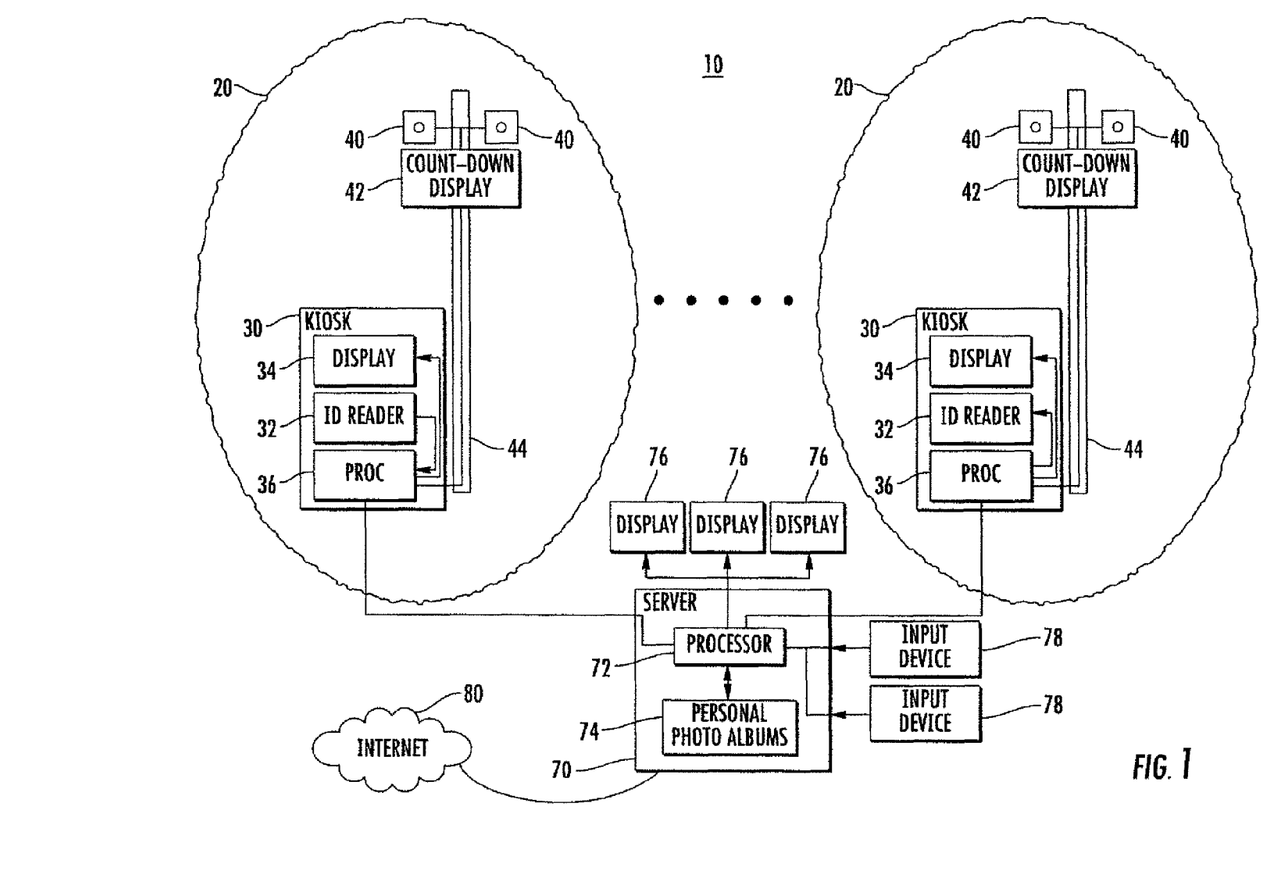
FIG. 1 is a block diagram of a guest-activated image capture system for a theme park in accordance with the present invention.

Referring initially to FIG. 1, a guest-activated image capture system 10 for a theme park will be discussed. The image capture system 10 is activated by park guests for initiating cameras 40 to take their photos throughout the theme park and to associate or link the captured photos to respective personal photo albums 74 for the guests.

The image capture system 10 includes a number of image capture areas 20 throughout the theme park. Each image capture area 20 includes at least one camera 40, and a kiosk 30. The kiosk 30 includes an identification (ID) reader 32, a display 34 and a processor 36 coupled to the ID reader 32 and to the display 34. Each image capture area 20 also includes a count-down display 42 associated with the at least one camera 40 for directing the park guests' attention to the at least one camera.

The display 34 is for communicating to the park guests that the image capture system 10 is working and operating. The display 34 also provides instructions to the park guest on how to activate the at least one camera 40. To activate the camera 42, a guest will present a park guest ID to the ID reader 32. The park guest ID may be a bar code or other type of image, as readily appreciated by those skilled in the art. Once the park guest ID is read, the guest has a limited amount of time to get in position. The ground will be clearly marked with a ground marking 41 on where the park guest is to stand.

The park guest ID presented by the park guest is the triggering mechanism that starts the process for activating the camera 40 to automatically take a photo of the park guest. An advantage of each image capture area 20 is that photos of the park guests can be taken without the need for a park employee to be present.

Once in position, the park guest will look at the at least one camera 40, which may be mounted on a pole 44. Also mounted on the pole 44 next to the at least one camera 40 is the count-down display 42. The count-down display 42 may be configured as a scrolling display, for example, and counts down 3 . . . 2 . . . 1 when the at least one camera 40 will take a photo.

The park guest ID presented by the guest is linked to the captured photo by the processor 36. However, for the guest to be able to later view and purchase the captured photo, personal information of the guest, such as an email address, needs to be associated with the park guest ID. The park guest ID and guest information is stored on a server 70 coupled to the kiosks 30.

Figure 2:
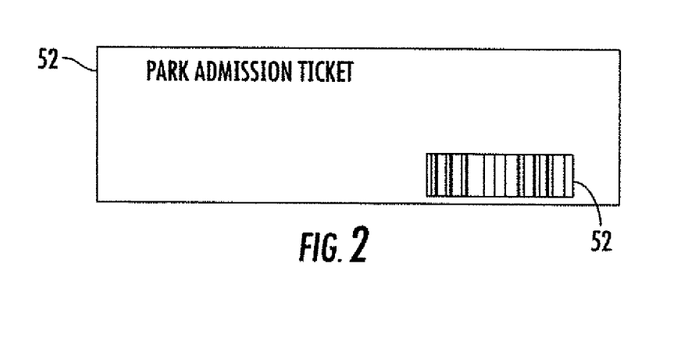
FIG. 2 is a view of park ticket with a bar code thereon for activating the image capture system in FIG. 1.
Figure 3:
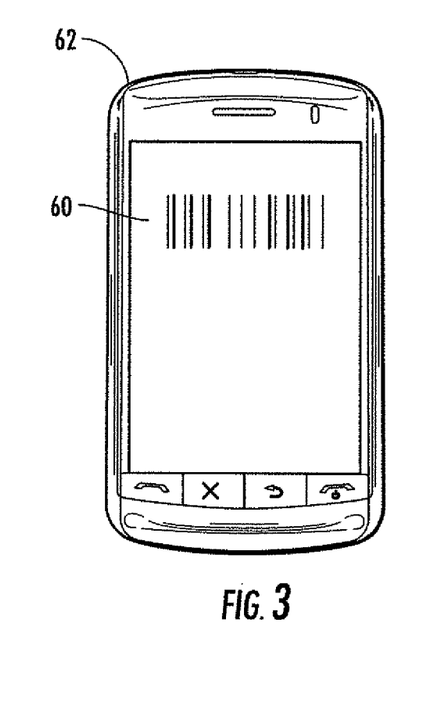
FIG. 3 is a front view of mobile wireless communications device displaying a self-generated bar code for activating the image capture system in FIG. 1.

A guest may use a bar code 50 on a printed admissions ticket 52 as the park guest ID to activate the image capture system 10, as illustrated in FIG. 2. Alternatively, a guest may use a bar code 60 as the park guest ID, with the bar code being generated by an application downloaded onto a mobile wireless communications device 62 carried by the park guest, as illustrated in FIG. 3. In addition, a badge with a bar code may be used, for example.

The printed ticket 52 may be a seasonal pass or a park admission ticket ordered on-line. For these types of tickets, guest information is made available at the time of ticket purchase. Consequently, an email address of the park guest is linked to the bar code which allows for the park guest to easily retrieve and view the photo album 74 of their captured photos.

A park admission ticket purchased at the theme park may also be used to activate the image capture system 10 even if information of the park guest has not been associated with the bar code on the ticket. For the park guest to retrieve and view the captured photos, the park guest needs to enter their personal information. This may be done while the park guest is still at the theme park.

The server 70 includes a processor 72 and a memory 74 coupled thereto. The memory is used to store the personal photo albums 74, i.e., captured park guests' photographs. One or more displays 76 are coupled to the server 70 for park guests to view their retrieved photographs. In addition, one or more input devices 78 are provided for park guests to associate their personal information to their particular bar code.

The same park guest ID may be used by the park guest at other fixed image capture areas to take additional photos of the park guest based on each respective ID reader 32 reading the same park guest ID. The server 70 stores the additional photos of the park guest with the same linked park guest ID so as to form a personal photo album 74 of the park guest.

For a park guest to retrieve and purchase photos from their personal photo album 74 stored on the server 70, the park guest does not need to be at the theme park. The park guest can access their personal photo album 74 through the Internet 80 away from the theme park. However, the park guest is also able to view their personal photo album 74 while at the theme park by using an input device 78 and display 76 coupled to the server 70. The input device 78 may be a keypad or an ID reader, for example.

Figure 4:
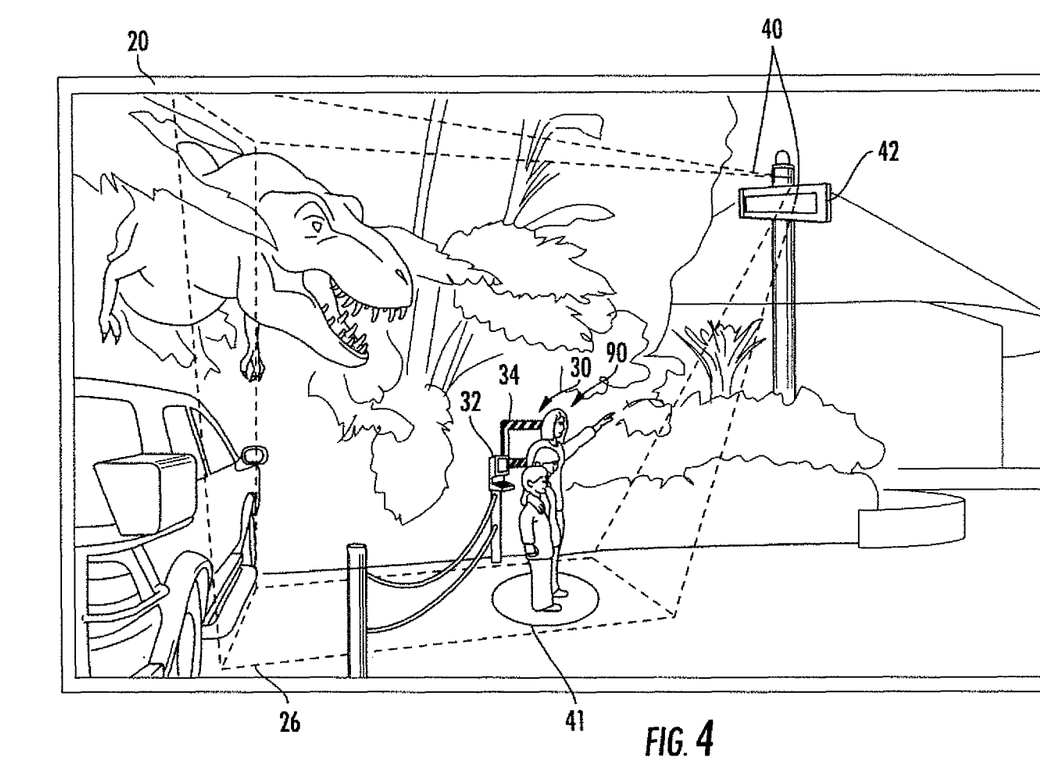
FIG. 4 is a photographic side view of an image capture area for an image capture system at a theme park in accordance with the present invention.

Each image capture area 20 is preferably positioned at a scenic location in the theme park, as illustrated in FIG. 4. An image capture area 20 may also be referred to as a hot-set area. After the park guest 90 has had their bar code read by the bar code reader 32, they stand in the marked location and their attention is directed to the pole mounted cameras 40.

Even though two pole mounted cameras 40 are illustrated, one is operational whereas the other one is a backup. Alternatively, both cameras 40 are activated for taking a photo, but one of the cameras provides a panoramic view. As noted above, the count-down display 42 may be configured as a scrolling display for getting the attention of the park guests, and for counting down 3 . . . 2 . . . 1 when the camera 40 will take a photo.

Figure 5:
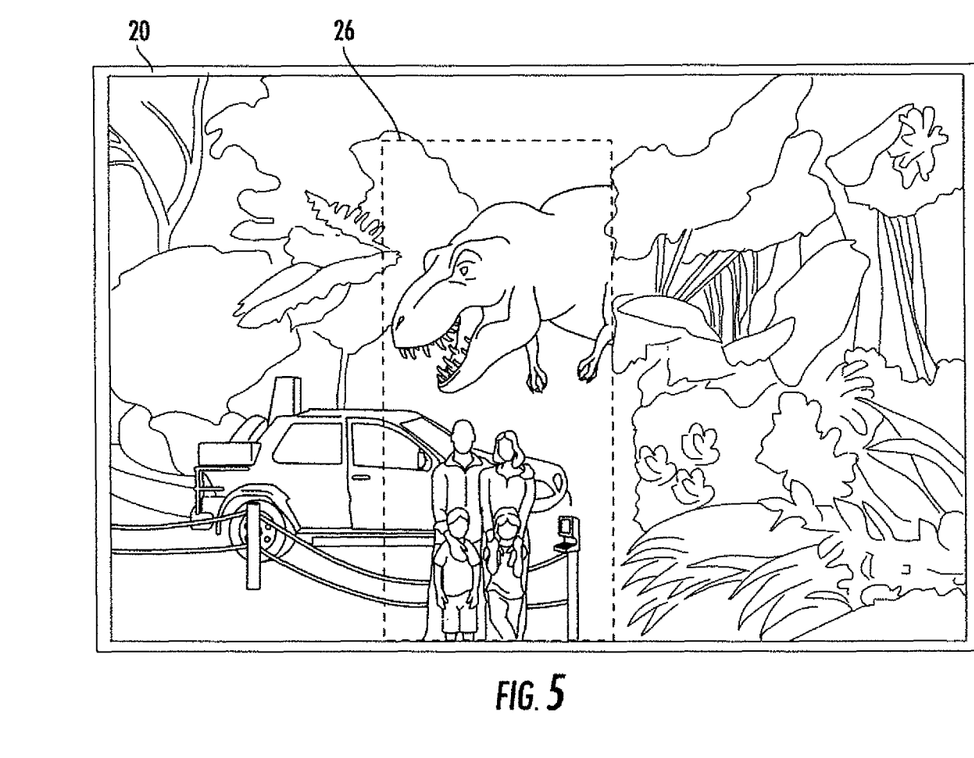
FIG. 5 is a photographic front view of the image capture area in FIG. 4.
Figure 6:
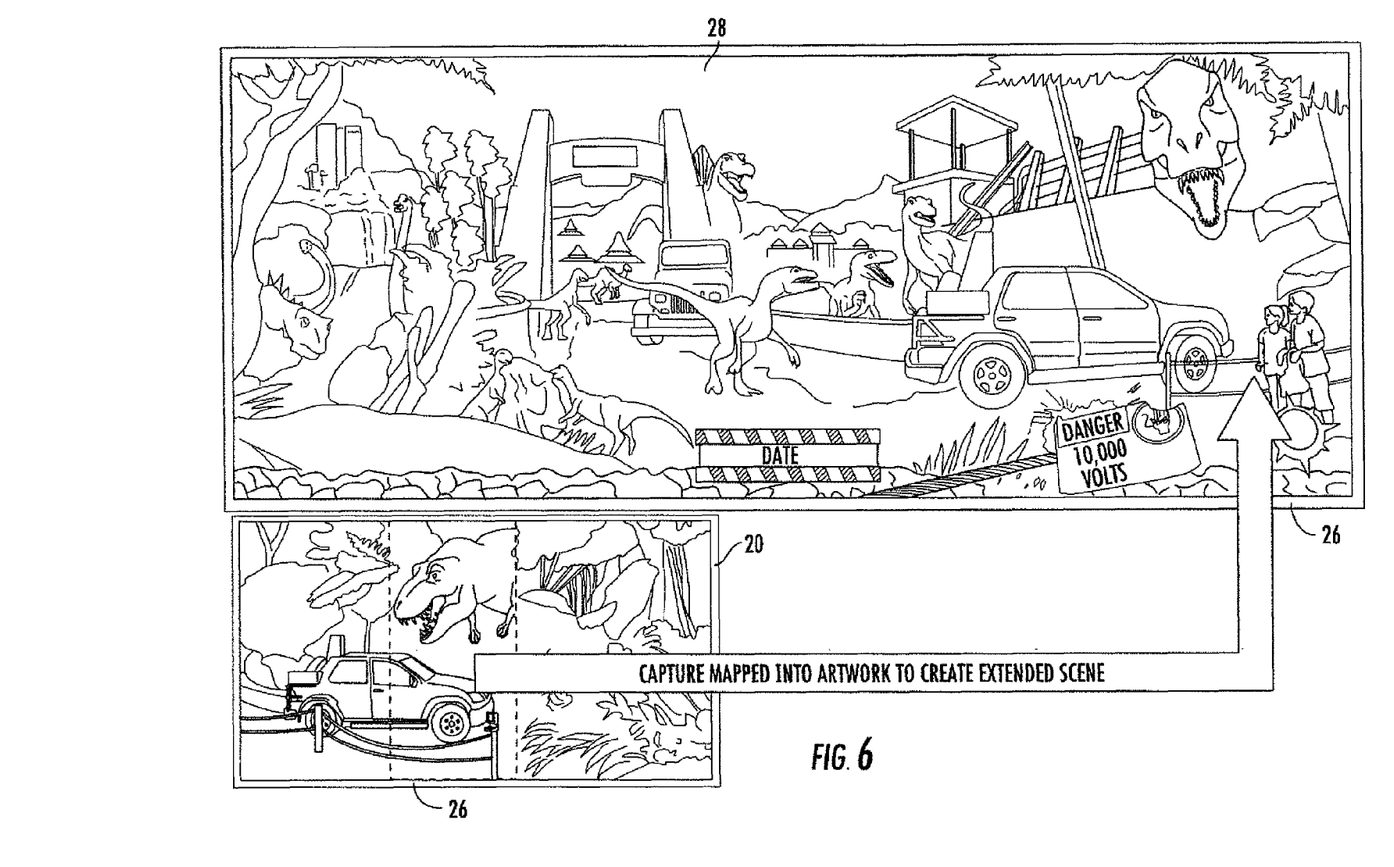
FIG. 6 is a photographic panoramic view that maps the captured photo from the image capture area in FIG. 4 to create an extended scene in accordance with the present invention.

The image capture area 20 may use the far-right image capture area portion 26 of the available area, for example, so as to allow ample space for non-participant park guests to shoot their own photographs. Another view of the image capture area portion 26 of the available area is provided in FIG. 5. In this situation, the foliage obstructs part of the shot and needs to be cut back. The image capture system 10 also allows the captured photo from the image capture area 26 in FIG. 4 to be mapped to an extended scene 28. The extended scene 28 is a panoramic view extending the theme of the image capture area 20.

Figure 7:
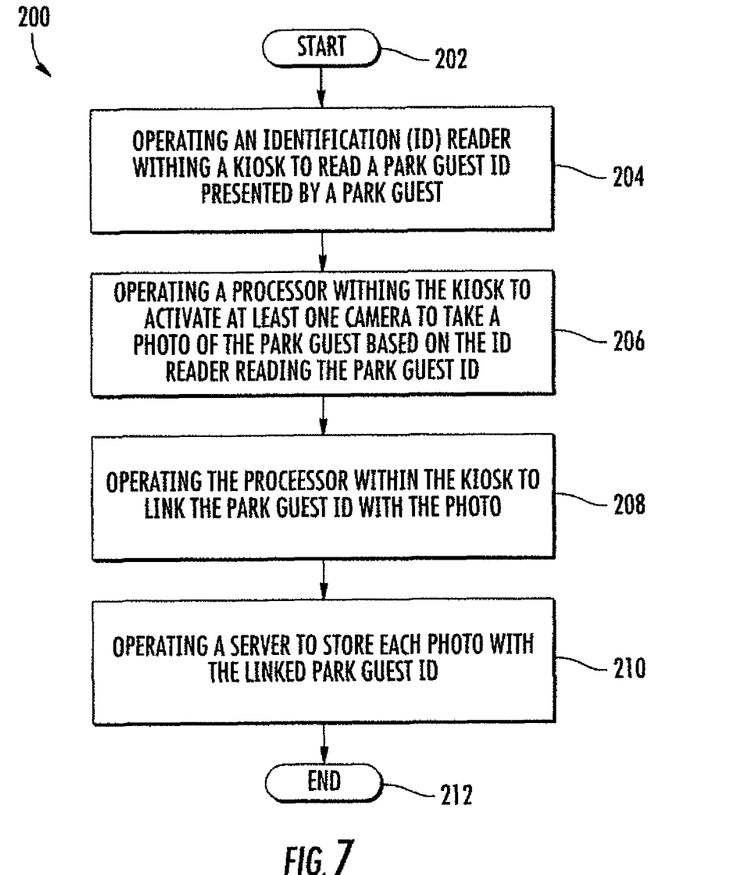
FIG. 7 is a flowchart illustrating a method for operating the image capture system for a theme park as illustrated in FIG. 1.

Referring now to the flowchart 200 in FIG. 7, another aspect is directed to a method for operating above-described image capture system 10 for a theme park. The method comprises, from the start (Block 202), operating the ID reader 32 within the kiosk 30 at Block 204 to read a park guest ID presented by a park guest. The processor 36 within the kiosk 30 is operated at Block 206 to activate the at least one camera 40 to take a photo of the park guest based on the ID reader 32 reading the park guest ID. The processor 36 within the kiosk 30 is operated at Block 208 to link the park guest ID with the photo. The method further comprises operating the server 70 at Block 210 to store each photo with the linked park guest ID. The method ends at Block 212.

Figure 8:
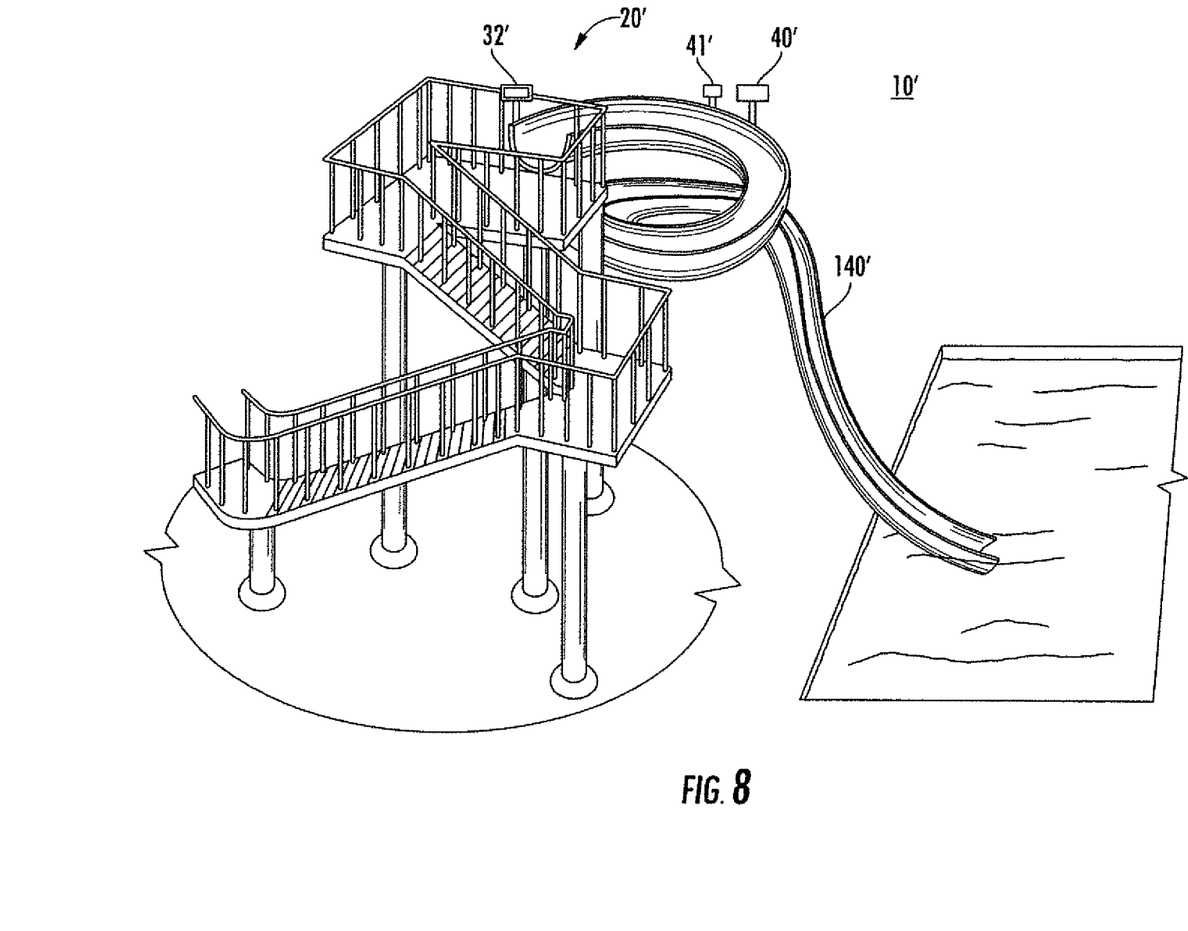
FIG. 8 is a block diagram of a guest-activated image capture system for a water park in accordance with the present invention.

Yet another aspect of the image capture system 10' is directed to water parks, as illustrated in FIG. 8. A water park guest next in line to slide down the water slide 140' presents their park guest ID or bar code to the ID or bar code reader 32'. Instead of the camera being operated based on a time delay, a sensor 41' is used to indicate that the water park guest is in position so that the camera 40' is activated to take a photo.

The bar code carried by the water park guest may be on a water proof wrist band worn by the water park guest. Although not illustrated, multiple image capture areas 20' are spaced throughout the water park. The captured photographs are provided to a server that stores a respective personal photo album for later viewing by the water park guest.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An image capture system for a venue comprising:
 a plurality of fixed image capture areas spaced throughout the venue, each fixed image capture area comprising
  at least one camera, and
  a kiosk coupled to said at least one camera and comprising
   an identification (ID) reader configured to read a guest ID presented by a guest, and
   a processor configured to
   activate said at least one camera to take a photo of the guest based on said ID reader reading the guest ID, and to link the guest ID with the photo; and
 a server coupled to said plurality of fixed image capture areas and configured to store each photo with the linked guest ID.

2. The image capture system according to claim 1 wherein the same guest ID is used by the guest at other fixed image capture areas to take additional photos of the guest based on each respective ID reader configured to read the same guest ID; and wherein said server stores the additional photos of the guest with the same linked guest ID so as to form a personal photo album of the guest.

3. The image capture system according to claim 1 further comprising:
 at least one input device coupled to said server and configured to receive the guest ID from the guest; and
 at least one display coupled to said server and configured to display the photo linked with the guest ID as received by said at least one input device.

4. The image capture system according to claim 1 wherein said server is coupled to the Internet to allow the guest to remotely retrieve each photo with the linked ID.

5. The image capture system according to claim 4 wherein said server is further configured to associate an email address of the guest with the guest ID to assist with the retrieval.

6. The image capture system according to claim 1 wherein each fixed image capture area further comprises a countdown display coupled to said processor, with said countdown display being activated based on said ID reader reading the guest ID to count-down a pre-defined time before activating said at least one camera.

7. The image capture system according to claim 1 wherein each fixed image capture area comprises a ground marking on where the guest is to stand for the photo.

8. The image capture system according to claim 1 wherein said at least one camera is configured to take a photo with a panoramic view.

9. The image capture system according to claim 1 wherein said kiosk further comprises a display coupled to said processor, with said processor further configured to display instructions on how to activate said at least one camera.

10. The image capture system according to claim 1 wherein the guest ID is on an admission ticket used by the guest to enter the venue.

11. The image capture system according to claim 1 wherein the guest ID is generated by a mobile wireless communications device carried by the guest.

12. The image capture system according to claim 1 wherein each image capture area has a theme associated therewith; and wherein said processor is further configured to map the photo of the guest within the themed image capture area to an extended scene, with the extended scene being a panoramic view extending the theme of the themed image capture area.

13. An image capture system for a venue comprising:
 a plurality of fixed image capture areas spaced throughout the venue, each fixed image capture area comprising
  at least one camera, and
  an identification (ID) reader associated with said at least one camera and configured to read a guest ID presented by a guest, and
  a processor configured to activate said at least one camera to take a photo of the guest based on said ID reader reading the guest ID, and to link the guest ID with the photo; and
 a server coupled to said plurality of fixed image capture areas and configured to store each photo with the linked guest ID.

14. The image capture system according to claim 13 wherein the same guest ID is used by the guest at other fixed image capture areas to take additional photos of the guest based on each respective ID reader configured to read the same guest ID; and wherein said server stores the additional photos of the guest with the same linked guest ID so as to form a personal photo album of the guest.

15. The image capture system according to claim 13 further comprising:
- at least one input device coupled to said server and configured to receive the guest ID from the guest; and
- at least one display coupled to said server and configured to display the photo linked with the guest ID as received by said at least one input device.

16. The image capture system according to claim 13 wherein said server is coupled to the Internet to allow the guest to remotely retrieve each photo with the linked ID.

17. The image capture system according to claim 13 wherein each fixed image capture area further comprises a count-down display coupled to said processor, with said count-down display being activated based on said ID reader reading the guest ID to count-down a pre-defined time before activating said at least one camera.

18. The image capture system according to claim 13 further comprises a display coupled to said processor, with said processor further configured to display instructions on how to activate said at least one camera.

19. The image capture system according to claim 13 wherein the guest ID is on an admission ticket used by the guest to enter the venue.

20. The image capture system according to claim 13 wherein the guest ID is generated by a mobile wireless communications device carried by the guest.

21. The image capture system according to claim 13 wherein each image capture area has a theme associated therewith; and wherein said processor is further configured to map the photo of the guest within the themed image capture area to an extended scene, with the extended scene being a panoramic view extending the theme of the themed image capture area.

22. A method for operating an image capture system for a venue comprising a plurality of fixed image capture areas spaced throughout the venue, each fixed image capture area comprising at least one camera, and a kiosk coupled to the at least one camera, and a server coupled to the plurality of fixed image capture areas, the method comprising:
- operating an identification (ID) reader within the kiosk to read a guest ID presented by a guest;
- operating a processor within the kiosk to activate the at least one camera to take a photo of the guest based on the ID reader reading the guest ID, and link the guest ID with the photo; and
- operating the server to store each photo with the linked guest ID.

23. The method according to claim 22 wherein the same guest ID is used by the guest at other fixed image capture areas to take additional photos of the guest based on each respective ID reader configured to read the same guest ID; and further comprising operating the server to store the additional photos of the guest with the same linked guest ID so as to form a personal photo album of the guest.

24. The method according to claim 22 further comprising:
- operating at least one input device coupled to the server to receive the guest ID from the guest; and
- operating at least one display coupled to the server to display the photo linked with the guest ID as received by the at least one input device.

25. The method according to claim 22 wherein the server is coupled to the Internet to allow the guest to remotely retrieve each photo with the linked ID.

26. The method according to claim 22 wherein each fixed image capture area further comprises a count-down display coupled to the processor, with the count-down display being activated based on the ID reader reading the guest ID to count-down a pre-defined time before activating the at least one camera.

27. The method according to claim 22 wherein the kiosk further comprises a display coupled to the processor, and further comprising operating the processor to display instructions on how to activate the at least one camera.

28. The method according to claim 22 wherein the guest ID is on an admission ticket used by the guest to enter the venue.

29. The method according to claim 22 wherein the guest ID is generated by a mobile wireless communications device carried by the guest.

30. The method according to claim 22 wherein each image capture area has a theme associated therewith; and further comprising operating the processor to map the photo of the guest within the themed image capture area to an extended scene, with the extended scene being a panoramic view extending the theme of the themed image capture area.

* * * * *